E. F. STEELE.
POTATO SORTER.
APPLICATION FILED JUNE 19, 1917.
1,275,099.
Patented Aug. 6, 1918.
6 SHEETS—SHEET 1.
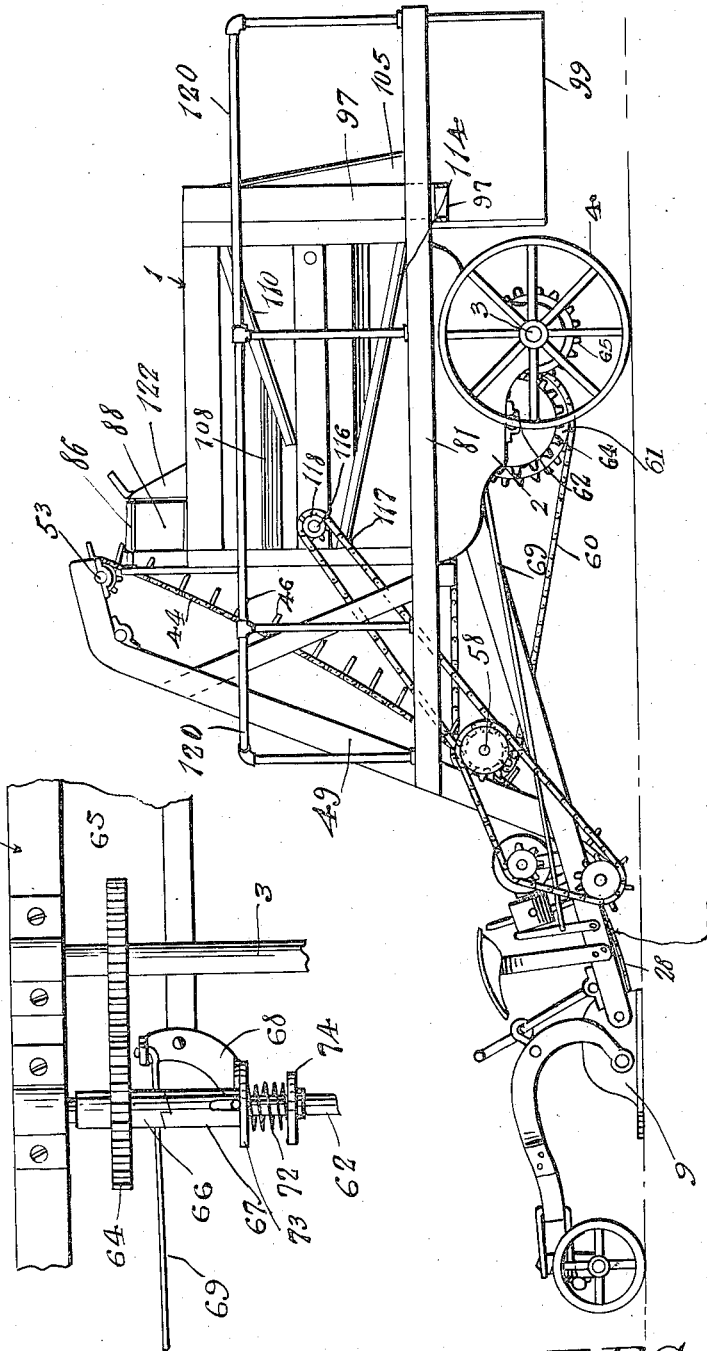
Inventor
E. F. Steele

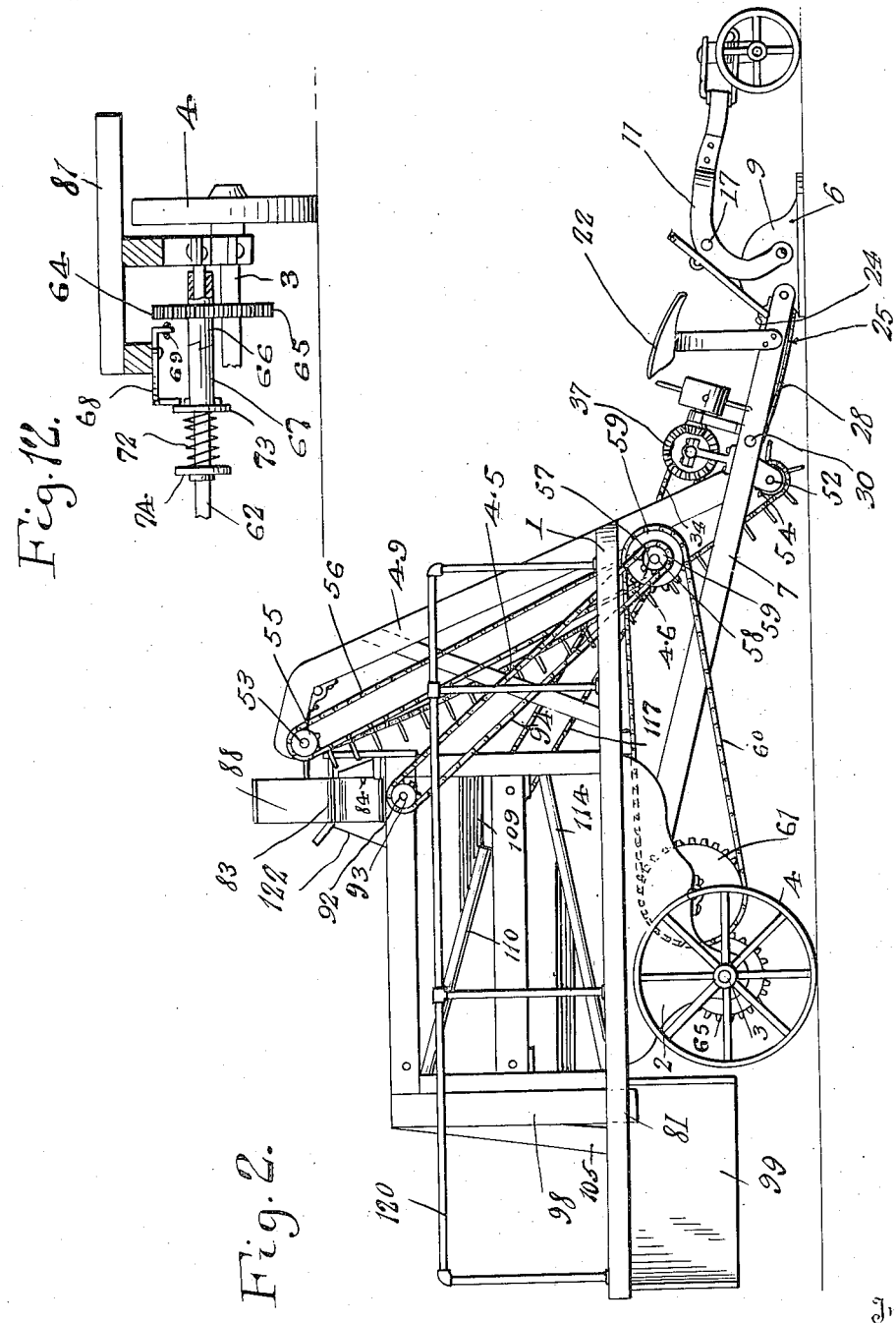

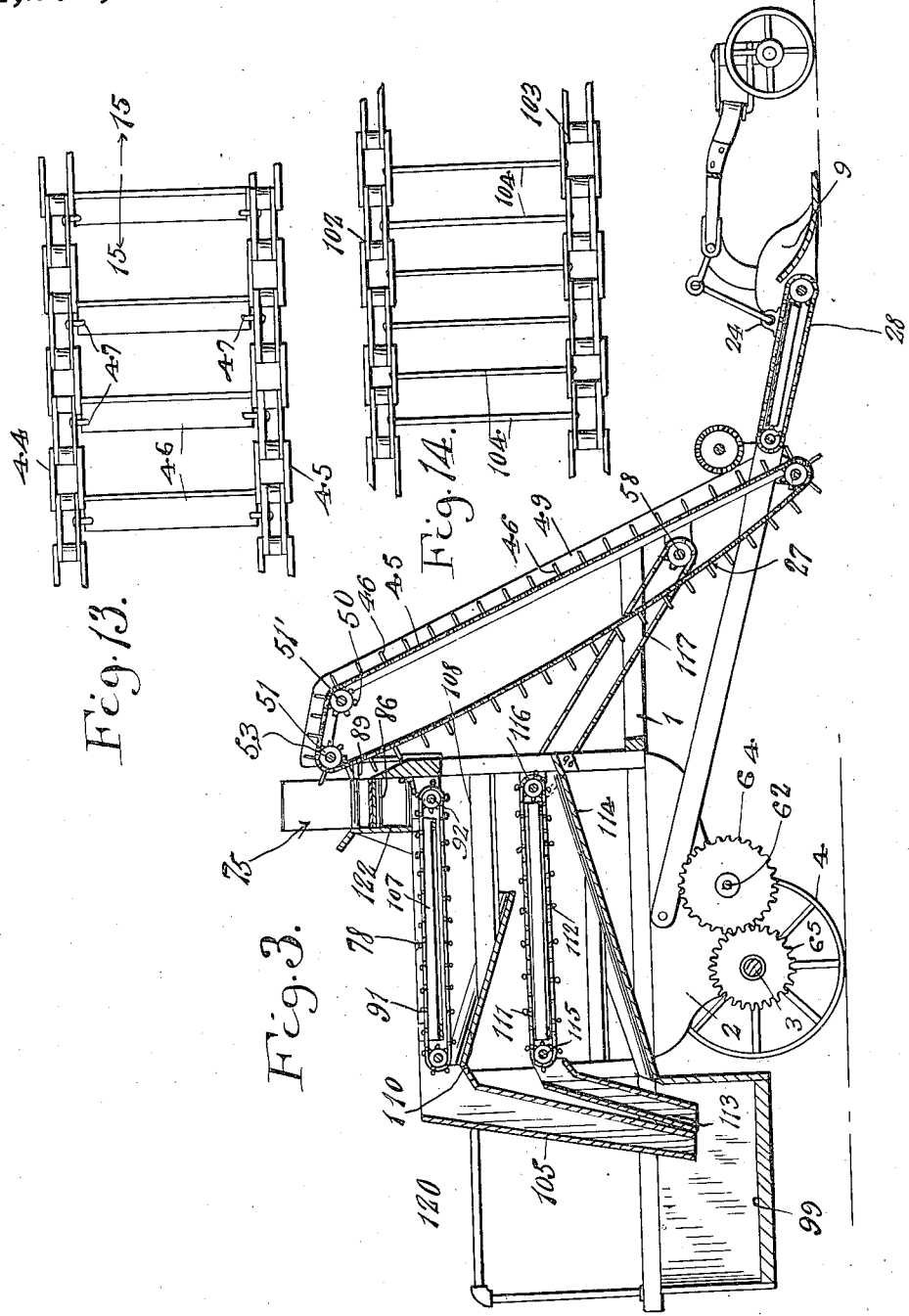

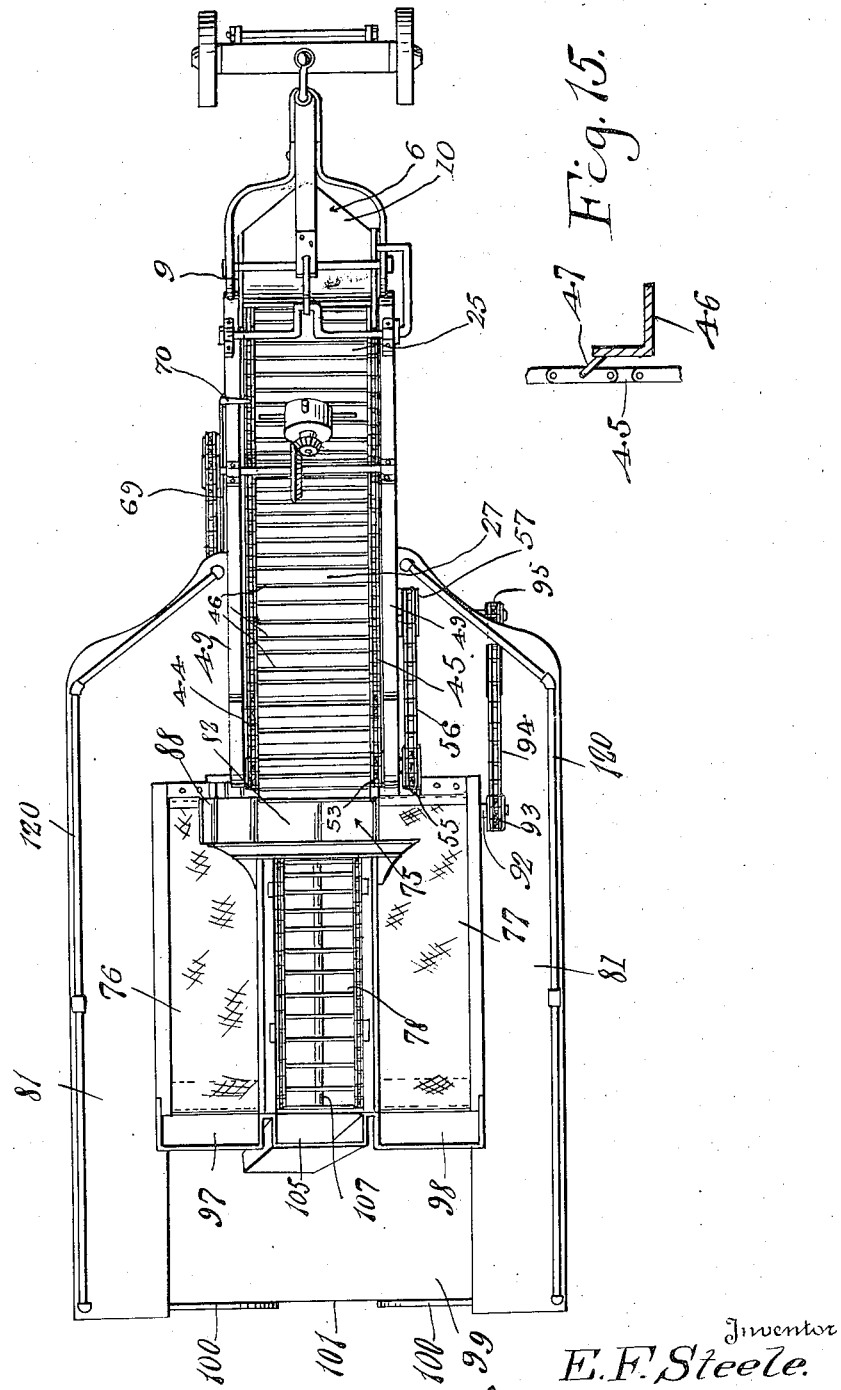

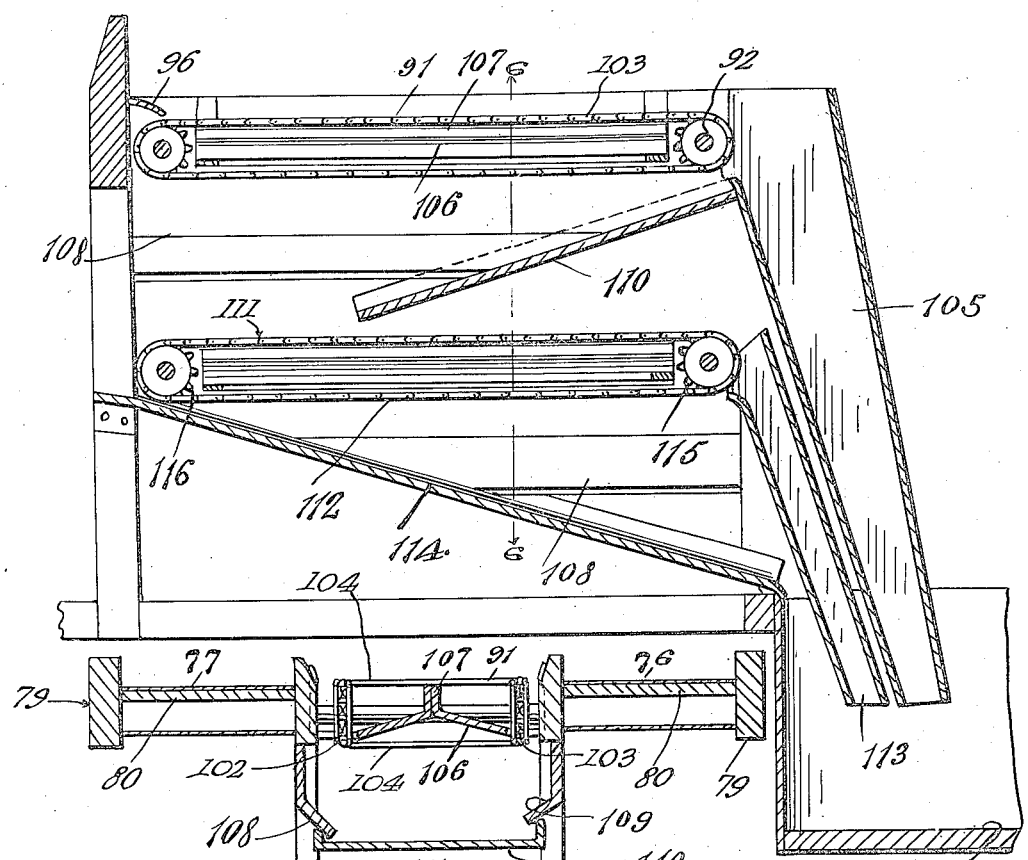

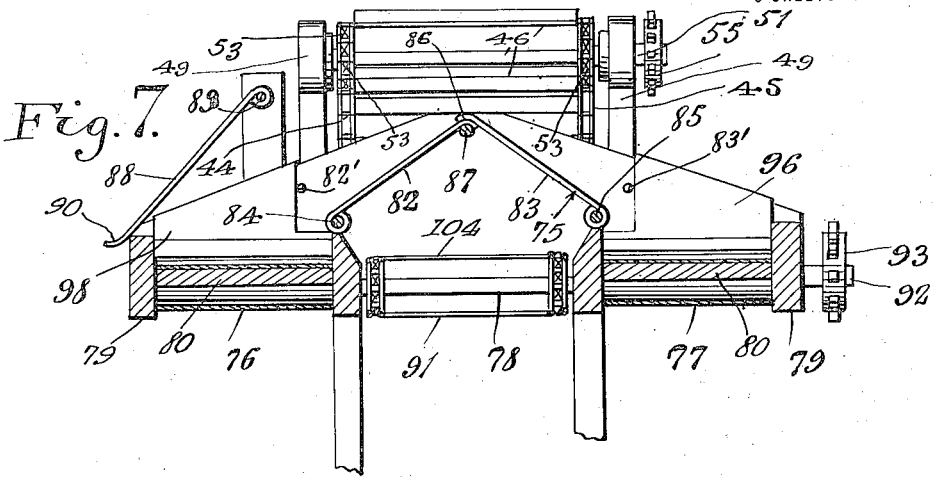
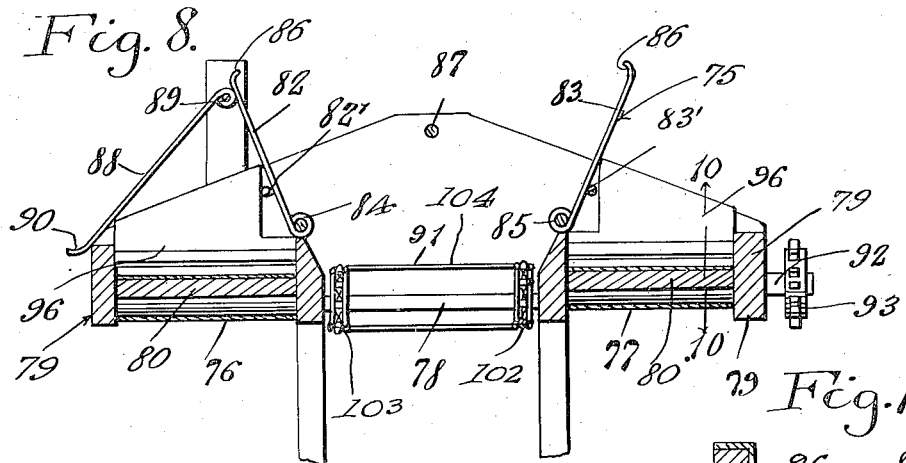
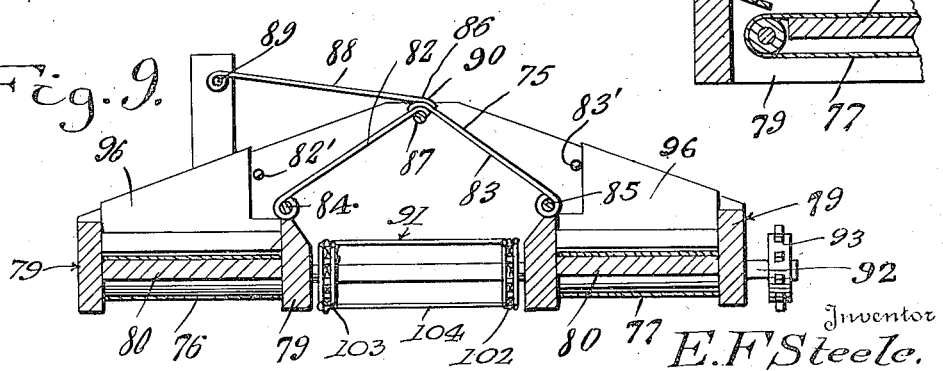

UNITED STATES PATENT OFFICE.

EDWARD F. STEELE, OF TERRE HAUTE, INDIANA.

POTATO-SORTER.

1,275,099.

Specification of Letters Patent.   Patented Aug. 6, 1918.

Application filed June 19, 1917.   Serial No. 175,620.

*To all whom it may concern:*

Be it known that I, EDWARD F. STEELE, a citizen of the United States, residing at Terre Haute, in the county of Vigo and State of Indiana, have invented certain new and useful Improvements in Potato-Sorters; and I do hereby declare the following to be a full, clear, and exact description of the invention, such as will enable others skilled in the art to which it appertains to make and use the same.

This invention relates to potato sorters, and the primary object of the invention is to provide a potato sorter as specified which includes a sorting or grading structure comprising a plurality of sorting chains or conveyers which carry the large potatoes thereover throughout their lengths and deposit them into chutes for delivery into sacks while the smaller potatoes fall through between the flights of the conveyer upon suitable guiding plates which guide the second grade of potatoes to a second sorting conveyer structure where the superior grade of the second grade of potatoes is separated from the smaller or inferior potatoes of the second grade.

A further object of this invention is to provide a pair of endless belts which are positioned along each side of the sorting structure and upon which the potatoes may be deposited, so that operators may pick the potatoes from the stones, culls, clods or the like and deposit the potatoes upon the sorting structure, allowing the foreign matter to pass over the rear ends of the belts for deposit upon the ground.

A still further object of this invention is to provide a plurality of pivotally mounted plates which are positioned for controlling the passage of the potatoes from the elevator, upon either of the side sorting belts or upon the sorting structure as desired.

With the foregoing and other objects in view, this invention consists in such novel features of construction, combination and arrangement of parts as will be hereinafter more fully described, illustrated in the accompanying drawings and claimed.

In describing the invention in detail, reference will be had to the accompanying drawings wherein like characters designate like and corresponding parts throughout the several views, and in which:—

Figure 1 is a side elevation of the improved potato sorter;

Fig. 2 is a side elevation of the potato sorter, looking at the side opposite to the one illustrated in Fig. 1;

Fig. 3 is a longitudinal section through the sorter;

Fig. 4 is a top plan view of the potato sorter;

Fig. 5 is an enlarged vertical section through the sorting structure;

Fig. 6 is a section on the line 6—6 of Fig. 5;

Fig. 7 is a vertical section through the upper portion of the sorting structure illustrating the side sorting belt and the pivoted potato guiding plates arranged for equally dividing the potatoes between the two side sorting belts;

Fig. 8 is a view similar to Fig. 7, only showing the pivoted guiding plates moved for guiding the potatoes directly to the sorting mechanism;

Fig. 9 is a view similar to Figs. 7 and 8, showing the pivoted guiding boards positioned for guiding all of the potatoes to one of the side sorting belts;

Fig. 10 is a section on the line 10—10 of Fig. 8;

Fig. 11 is a fragmentary plan, illustrating the clutch structure for controlling the operation of the sorter.

Fig. 12 is a side elevation of the mechanism illustrated in Fig. 11;

Fig. 13 is an enlarged fragmentary plan of a part of the elevator construction;

Fig. 14 is a detail plan of a part of one of the sorting chains; and

Fig. 15 is a section on the line 15—15 of Fig. 13.

Referring more particularly to the drawings, 1 designates the supporting frame of the potato sorter, which has bolsters 2 attached to the under surface of the same, adjacent its rear end. The bolsters 2 support the main supporting axle 3 of the harvester upon which are mounted the supporting wheels 4.

The potatoes are delivered to the conveyer structure 47 from any suitable type of uprooting means.

The conveyer structure 27 comprises a pair of endless chains 44 and 45 which have a plurality of flights 46 attached thereto by means of links 47 at spaced intervals. The flights 46 are constructed of angled metal so that they will properly engage and elevate the potatoes. The upward traveling run of the elevator structure travels between side boards 49 which prevent any of the potatoes from falling off the ends of the flights 46. The upper end of the upwardly traveling run of the conveyer structure 27 is guided into a substantially horizontal plane of movement by suitable idler guiding sprockets 50 which are carried by a shaft 51'. The chains 45 travel about sprockets 51 and 52 which are carried by shafts 53 and 54 respectively. The shaft 53 which is positioned at the top or upper delivery end of the structure, has a sprocket 55 mounted thereon about which a sprocket chain 56 travels. The sprocket chain 56 also travels about a sprocket 57 which is mounted upon a shaft 58. The shaft 58 is rotatably supported by the supporting structure, and has a sprocket 59 mounted thereon about which a sprocket chain 60 travels. The sprocket chain 60 also travels about a sprocket 61 which is carried by a shaft 62.

The shaft 62 has a gear 64 mounted thereon for independent rotation with respect to the shaft, and the gear 64 meshes with a gear 65 which is carried by the rear axle 3. The gear 64 has a clutch section 66 carried thereby which is adapted for coaction with a clutch section 67. The clutch section 67 is feathered upon the shaft 62 and it has a pivotally mounted arm 68 connected thereto to which arm is connected a rod 69. The rod 69 extends forwardly along the harvester frame and is connected to a hand lever 70 which is positioned in close proximity to the seat 22 as clearly shown in Fig. 1 of the drawings, so that upon oscillatory movement of the hand lever 70, the clutch section 67 may be moved into or out of engagement with the clutch section 66, for controlling the rotation of the shaft 62 by the rotation of the rear axle 3. A spring 72 is coiled about the shaft 62, and one end of the spring engages a collar 73 which is attached to the clutch section 67, while the other end engages a collar 74 which is carried by the shaft 62. The spring 72 tends to force the clutch section 67 outwardly into engagement with the clutch section 66 at all times, so that when the clutch sections are held out of engagement by the member 68, the spring 72 is under tension.

The potatoes are delivered from the upper delivery end of the elevator structure 27 to a guiding divider construction 75.

The guiding dividing structure 75 is provided for guiding the potatoes from the delivery end of the elevator 27 to the side sorting belts 76 and 77 or directly to the sorting structure 78.

The side sorting belts 76 and 77 are carried by a suitable supporting structure 79 and the upper runs of the belts travel over tables 80. Platforms 81 are supported upon each side of and below the sorting belts 76 and 77, upon which platforms the persons sorting the potatoes, stand. The guiding structure 75 includes a pair of plates 82 and 83 which are pivotally mounted upon suitable rods 84 and 85 respectively. The free edges of the plates 82 and 83 are curved as shown at 86, so that the edge of one of the plates may rest upon a rod 87 and the curved edge of the other plate rests upon the curved edge of the plate which is resting upon the rod 87, as clearly shown in Figs. 7 and 9 of the drawings. When the two plates 82 and 83 are positioned as shown in Fig. 7 of the drawings, forming a ridge centrally of the delivery end of the elevator structure 27, the potatoes delivered by the elevator structure will be substantially equally divided and delivered to the sorting belts 76 and 77. When it is desired to convey all of the potatoes to one of the sorting belts, namely to the sorting belt 77, a plate 88 which is pivotally mounted upon a pin 89 is moved so that its free curved edge 90 will rest upon the curved edges of the plates 82 and 83, as shown in Fig. 9 of the drawings. The plate 88 forms a gate or cut-off for preventing any of the potatoes from being delivered to the belt 76, and causing all of them to be delivered to the belt 77. When the plates 82 and 83 as well as the plate 88 are positioned outwardly as shown in Fig. 8 of the drawings, the potatoes will be deposited directly upon the sorting structure 78, eliminating the manual sorting of potatoes. The sorting belts 76 and 77 and the uppermost sorting conveyer 91 are operated by the rotation of a shaft 92 upon which a sprocket 93 is mounted. A sprocket chain 94 travels about the sprocket 93 and about a sprocket 95 which is mounted upon the shaft 58, as clearly shown in Fig. 2 of the drawings. Suitable guiding plates 96 are attached to the supporting structure 79 and they are provided for preventing potatoes from falling back of the receiving ends of the conveyer belts 76 and 77, as clearly shown in Fig. 10 of the drawings.

When the potatoes are delivered to the sorting belts 76 and 77, a person will pick the potatoes from off the belts during their travel, and deposit the potatoes upon the uppermost sorting conveyer 91 while the rocks, clods of dirt, culls, and other foreign matter will travel throughout the entire lengths of the upper runs of the conveyer belts and be delivered to downwardly extending chutes 97 and 98 which will deposit them upon the ground.

The topmost conveyer 91 of the sorting structure 78 is composed of a pair of sprocket chains 102 and 103 to which a plurality of flights 104 are connected. The flights 104 are positioned so that they will prevent the largest or first grade of potatoes from falling therethrough, and this first grade of potatoes will be carried throughout the entire lengths of the upper runs of the conveyer 91 and delivered to a chute 105 which may have a sack or any other suitable type of receiving receptacle positioned at its delivery end. The second grade of potatoes will fall between the flights 104 upon a guiding plate 106 which is positioned between the upper and lower runs of the conveyer 91, as clearly shown in Fig. 6 of the drawings. The plate 106 comprises a vertical longitudinally extending, centrally disposed portion 107 from each side of which the plate extends downwardly and outwardly, so that the potatoes will pass in each direction, out of the sides of the conveyer 91 and be guided by suitable side plates 108 and 109 upon a flat inclined guiding board 110. The board 110 inclines downwardly so that it will guide the potatoes of the second grade to the receiving end of the second sorting conveyer structure 111. The second sorting conveyer structure 111, is identical in construction to the conveyer 91 with the exception of the fact that the flights 112 of the conveyer are positioned closer together than are the flights 104, so that this conveyer will sort the largest potatoes of the second grade from the smaller potatoes, delivering the larger or second grade of potatoes to a chute 113 which may have a sack or analogous receiving receptacle carried by its delivery end into which the second grade of potatoes are deposited. The third grade of potatoes, may, if it is so desired, be delivered to a third conveyer structure, which is not shown in the drawings, without departing from the spirit of this invention, or, they may be deposited upon an inclined plate 114 which will guide them downwardly into a basket or other container mounted upon a platform 99. The number of the sorting conveyers may be regulated as desired by the person manufacturing the potato harvester.

The conveyer structure 111, which travels over shafts 115 and 116 is operated through the medium of a sprocket chain 117 which passes about a sprocket 118 that is carried by the shaft 116, and about a suitable sprocket which is mounted upon the shaft 58, as shown in Fig. 1 of the drawings.

A railing 120 may be mounted about the platforms 81 and 82, if it is so desired, without departing from the spirit of this invention.

A suitable guard plate 122 is carried by the supporting structure 79 so as to prevent the potatoes from passing over the ends of the pivoted guiding plates 82, 83 or 88.

In the operation of the improved potato harvester, the potatoes are first uprooted by the uprooting structure and delivered to the elevator structure 27. The elevator structure 27 will elevate the potatoes and deliver them to the guiding separator structure 75 so that when the plates 82 and 83 are positioned as shown in Fig. 7 of the drawings, the potatoes will be equally divided and guided to the side sorting belts 76 and 77 with which they will travel over the tables 80. During the travel of the potatoes with the assorting belts 76 and 77, persons standing upon the platforms 81 and 82 will pick the potatoes off the belts and deposit them upon the sorting conveyer 91, allowing the rocks, and other foreign material as well as the culls to pass off the delivery end of the belts and downwardly through the chutes 97 and 98, onto the ground. The potatoes, which are deposited upon the sorting conveyer 91 will be sorted, in the manner heretofore described, so that the first and second grades of potatoes, or any other number of grades which it is desired to preserve will pass out of the chutes positioned at the delivery ends of the sorting conveyers into sacks or suitable receptacles, while the very small potatoes will fall upon the inclined plate 114 and be delivered into a basket or container placed at delivery end on platform 99.

If it is desired to dispense with the manual sorting of the potatoes, the plates 82 and 83 are moved upwardly, so that they will guide the potatoes directly to the conveyer structure 91 and prevent any of them from falling upon the side belts 76 and 77. Suitable pins 82' and 83' are carried by the supporting structure for holding the plates 82 and 83 in their upper opened positions.

From the foregoing description taken in connection with the accompanying drawings, the advantages of construction and of the method of operation of the improved potato sorter will be readily apparent to those skilled in the art to which this invention appertains and, while in the foregoing description, the principle of the operation of this invention has been described together with various features of construction, it is to be understood that certain minor features of construction, combination and arrangement of parts may be altered to suit practical conditions provided such alterations are comprehended within the scope of what is claimed.

What is claimed is:—

1. In a potato harvester, the combination, of potato elevating means, a pair of endless belts, potato sorting means positioned between said belts, means for distributing potatoes from the elevating means upon the belts, said means arranged whereby all of the potatoes from the elevating means may be directed to one of the belts, said distributing means arranged so that the potatoes may be directed to said sorting means in lieu of upon said belts.

2. In a potato harvester, the combination, of potato elevating means, a pair of endless belts, potato sorting means positioned between said belts, means for distributing potatoes from the elevating means upon the belts, said means arranged whereby all of the potatoes from the elevating means may be directed to one of the belts, said distributing means arranged so that the potatoes may be directed to said sorting means in lieu of upon said belts, said means further arranged so that all of the potatoes from the elevating means may be directed to the sorting means.

3. In a potato harvester, the combination, of potato elevating means, and potato sorting means for receiving the potatoes from the elevating means, said sorting means including a plurality of endless sorting conveyers, chutes positioned at the ends of said conveyers for receiving potatoes therefrom, guiding boards positioned beneath the conveyers for receiving potatoes which fall through the conveyers and delivering them to the conveyer next therebelow, tables positioned upon each side of the chains, endless belts traveling over said conveyers, means for distributing potatoes from the elevating means upon the belts, said means arranged whereby all of the potatoes from the elevating means may be directed to one of the belts, said distributing means further arranged so that the potatoes may be directed to said sorting means in lieu of to said belts.

4. In a potato harvester, the combination, of potato elevating means, potato sorting means for receiving potatoes from the elevating means and including a plurality of endless sorting conveyers, chutes positioned at the ends of said conveyers for receiving potatoes therefrom, guiding boards positioned beneath the conveyers for receiving potatoes which fall through the conveyers and delivering them to the conveyer next therebelow, tables positioned upon each side of said chains, endless belts traveling over said tables, a pair of pivotally mounted plates, said pivoted plates being mounted for having their free edges engaging equi-distant of said belts and beneath the delivery end of said elevator whereby the potatoes will be equally distributed to said belts.

5. In a potato harvester, the combination, of potato elevating means, potato sorting means for receiving potatoes from the elevating means and including a plurality of endless sorting conveyers, chutes positioned at the ends of said conveyers for receiving potatoes therefrom, guiding boards positioned beneath the conveyers for receiving the potatoes which fall through the conveyers and delivering them to the conveyer next therebelow, tables positioned upon each side of said chains, endless belts traveling over said tables, a pair of pivotally mounted plates, said pivoted plates being mounted for having their free edges engaging equi-distant of said belts and beneath the delivery end of said elevator whereby the potatoes will be equally distributed to said belts, and a third pivotally mounted plate adapted to engage the upper engaging edges of said first named pivoted plates for guiding all of the potatoes to one of said belts.

6. In a potato harvester, the combination, of potato elevating means, potato sorting means for receiving the potatoes from the elevating means and including a plurality of endless sorting conveyers, chutes positioned at the ends of said conveyers for receiving potatoes therefrom, guiding boards positioned beneath the conveyers for receiving the potatoes which fall through the conveyers and delivering them to the conveyer next therebelow, tables positioned upon each side of said chains, endless belts traveling over said tables, a pair of pivotally mounted plates, said pivoted plates being mounted for having their free edges engaging equi-distant of said belts and beneath the delivery end of said elevator whereby the potatoes will be equally distributed to said belts, and a third pivotally mounted plate adapted to engage the upper engaging edges of said first named pivoted plates for guiding all of the potatoes to one of said belts, chutes extending downwardly from the delivery ends of said belts for receiving rocks and other foreign material and depositing it upon the ground, and a platform carried by the rear end of the harvester.

In testimony whereof I affix my signature in presence of two witnesses.

EDWARD F. STEELE.

Witnesses:
 FLORENCE PAGE,
 GEORGE C. BOWEN.